United States Patent [19]

Berglund et al.

[11] 4,266,272
[45] May 5, 1981

[54] TRANSIENT MICROCODE BLOCK CHECK WORD GENERATION CONTROL CIRCUITRY

[75] Inventors: Neil C. Berglund, Kasson; William G. Kempke, Rochester, both of Minn.

[73] Assignee: International Business Machines Corporation, Armonk, N.Y.

[21] Appl. No.: 950,898

[22] Filed: Oct. 12, 1978

[51] Int. Cl.³ .............................................. G06F 11/26
[52] U.S. Cl. ....................................... 364/200; 371/53
[58] Field of Search ....................... 364/200; 235/312; 340/146.1 AJ; 371/38, 53

[56] References Cited

U.S. PATENT DOCUMENTS

| | | | |
|---|---|---|---|
| 3,579,185 | 9/1967 | Spruth | 340/146.1 AJ |
| 3,792,441 | 2/1974 | Wymore et al. | 364/200 |
| 3,964,027 | 6/1976 | Dalmasso | 364/200 |
| 4,092,732 | 5/1978 | Ouchi | 235/312 X |

Primary Examiner—David H. Malzahn
Attorney, Agent, or Firm—Donald F. Voss

[57] ABSTRACT

Control circuitry is provided for controlling the generation of a block check word simultaneously with the writing of control words into a transient area of a writeable control storage. The control circuitry in response to a write control storage instruction generates control signals for controlling existing central processing unit (CPU) hardware to effect generation of the block check word while a control word is being written into the transient area of control storage. Microinstructions in the resident area for performing the overlay force selection of a local storage register which has been initialized. The operand from the local storage register is applied to the ALU together with the word which is also being written into control storage. The ALU is forced to perform an exclusive OR operation and the result is returned to the selected LSR. In this manner a block check word is dynamically calculated word by word as each word is written into control storage. When all the control words have been loaded into control storage, a pre-calculated block check word is retrieved from main storage and compared with the calculated block check word. A miscompare indicates that the group of control words written into control storage had been modified when resident in main storage.

8 Claims, 8 Drawing Figures

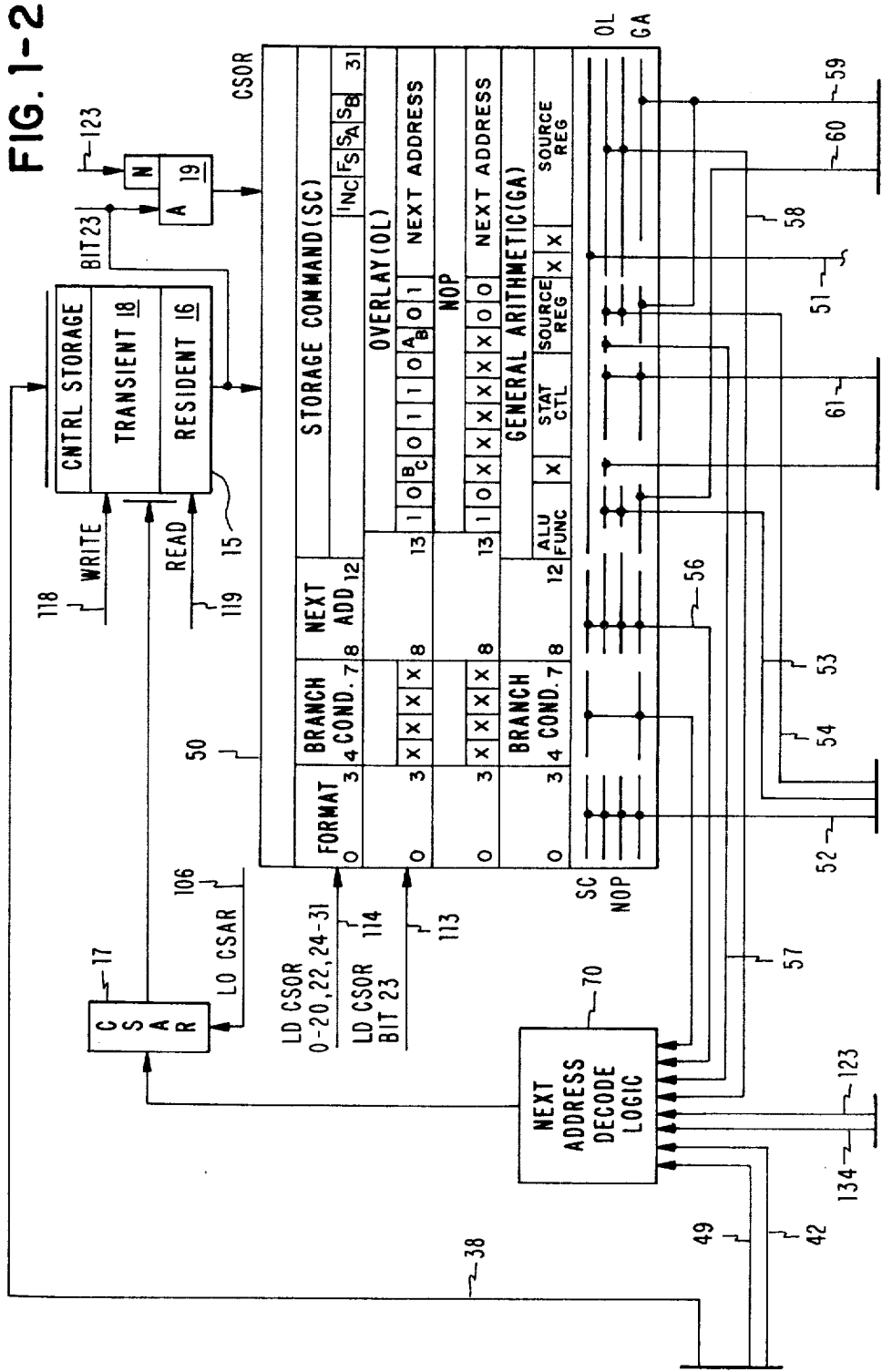

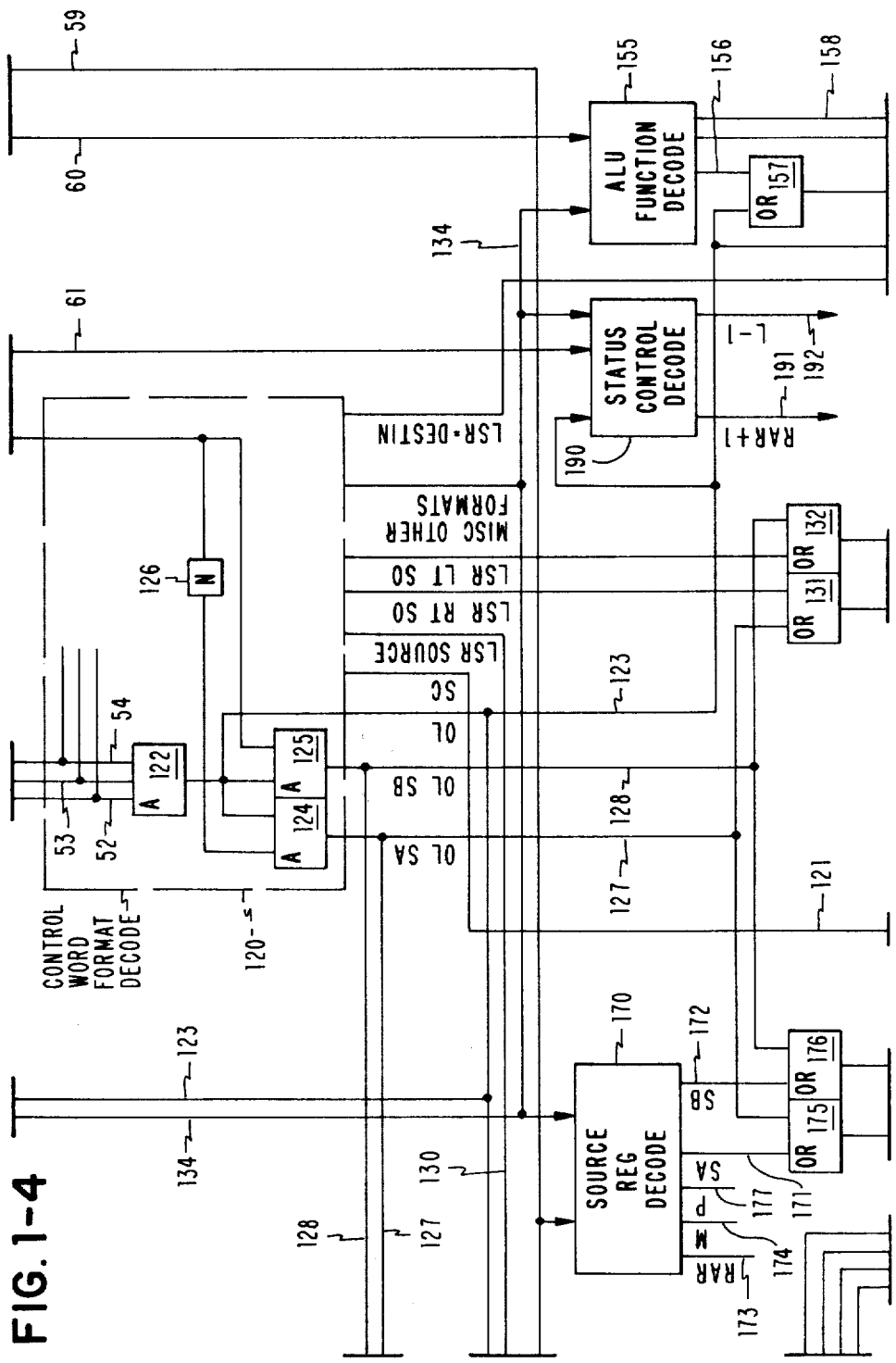

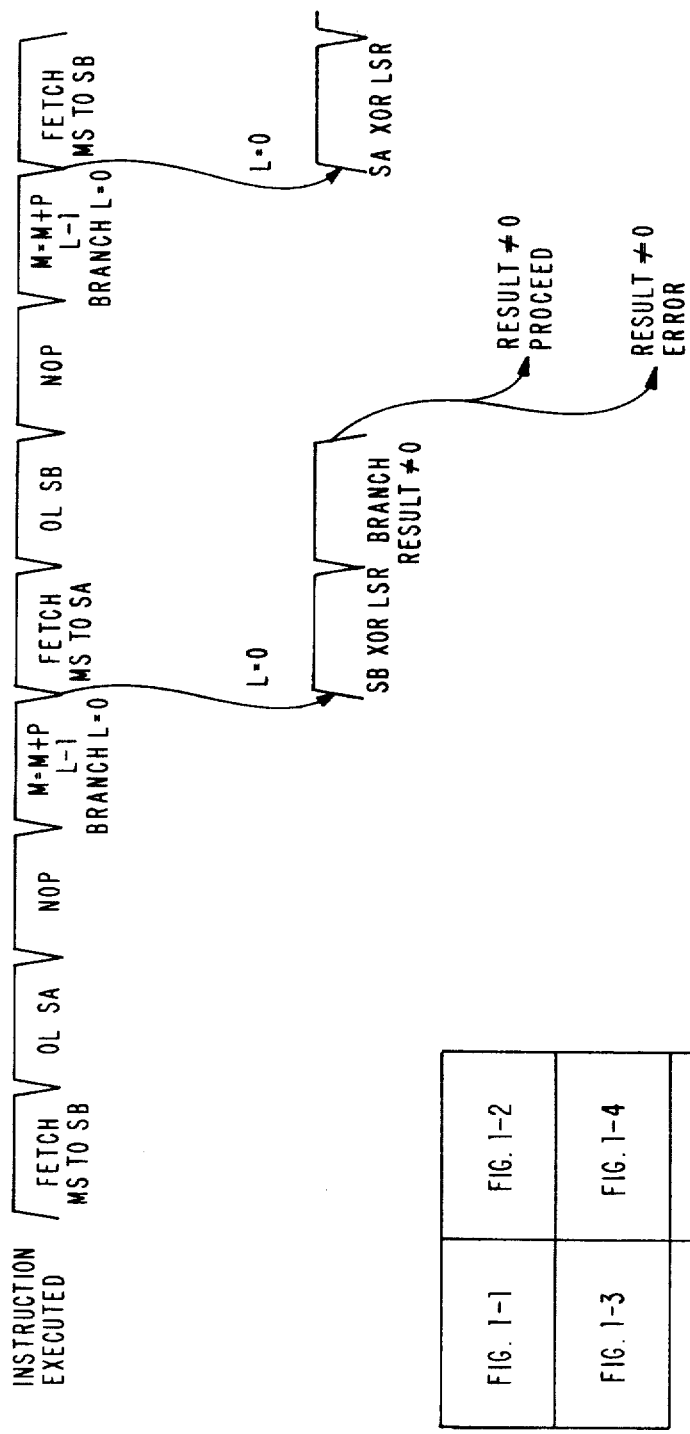

TRANSIENT MICROCODE BLOCK CHECK WORD GENERATION CONTROL CIRCUITRY

DESCRIPTION

1. Field of the Invention

This invention relates to control circuitry in a computer system for controlling the generation of a block check word simultaneously with the writing of control words into control storage and more particularly, to such control circuitry which is responsive to a write control storage instruction to provide control signals to existing central processing unit (CPU) hardware to effect generation of a block check word during the same time a control word fetched from main storage is being written into control storage.

2. Description of the Prior Art

In the past it generally has been the practice to have a control storge which is large enough to contain all of the necessary control words or include control words in main storage and execute the control words retrieved from main storage without first transferring the control words from main storage into control storage as set forth in U.S. Pat. No. 3,964,027 dated June 15, 1976. The latter approach may be suitable if a system is designed initially to operate in that particular manner. On the other hand, if a system is designed to execute control words only from control storage, then significant modifications to the system are required in order to execute control words from both main storage and control storage. On the other hand, normally there is, or it is easy to add, a data path via the central processing unit between main storage and control storage and thus it is usually a simple matter to transfer control words from main storage and overlay them into a transient area in control storage. Hence, a system may be designed intentionally with a control storage that is smaller than necessary and have the control storage partitioned into resident and transient portions so as to reduce the cost of control storage. The control words which do not fit into the small control storage are contained in main storage which is constructed from a less expensive technology. The control words in main storage are stored in groups or modules which are then transferred on damand from main storage into the transient area of control storage.

It is also possible that a system can outgrow its original capacity of control storage and in that instance it would be less expensive to provide the additional capacity in main storage than it would be to provide a larger control storage. In any event whenever control words are permitted to reside in main storage, there is an exposure that the control words could be unintentionally modified by other programs and particularly user programs which generally have access to main storage. Consequently, it is highly desirable to either protect against modification or to detect whether or not control words in main storage have been modified. Generally speaking storage protection is more costly than modification detection circuitry.

It has been found that performance degradation caused by the time required to transfer a module of control words from main storage to control storage is relatively insignificant and with a particular mix of control word sequences has been found to be in the order to 5%, i.e., if control storage were large enough to contain all the control words there would be only a 5% performance improvement. In one instance in accordance with the present invention, the computer system required approximately 8,000 control words but control storage had a capacity for only 4,000 control words. The additional control words were stored in main storage and transferred to control storage on a demand basis in groups or modules of 64 words. Each group or module includes a block check word precalculated at microcode linkage edit time and inserted at the end of the module. The block check word is calculated as the exclusive OR of corresponding bits of all words within the module. As each module is overlaid into control storage, the central processing unit dynamically calculates a block check word by word as each control word of the module is loaded into control storage. When all control words of the module have been loaded into control storage, a resident microcode overlay handler sequence fetches the precalculated block check word and compares it with the calculated block check word. A miscompare indicates that the overlay module has been modified by the software system.

A control storage overlay arrangement of the prior art is set forth in U.S. Pat. No. 3,792,441 but it does not include any apparatus for generating a block check word as control words are being written into control storage. Generation of a block check word during a data transfer operation is also known in the prior art as in U.S. Pat. No. 3,579,185, for example. The prior art; however, does not teach a CPU generating a block check word simultaneously with the CPU writing a control word into control storage. In addition, and still more significantly, the prior art does not teach or suggest using the existing facilities of the central processing unit to simultaneously write a control word into control storage and generate a block check word.

SUMMARY OF THE INVENTION

The principal objects of the invention are to provide improved control circuitry which:

(1) Generates a block check word simultaneously with the writing of control words into control storage;

(2) Utilizes existing cental processing unit facilities to effect generation of the block check word while a control word is being written into control storage;

(3) Does not significantly degrade performance of the computer system;

(4) Verifies the integrity of control words written into control storage from main storage; and (5) Is relatively inexpensive.

The foregoing objects are achieved by providing a special data path between main storage and control storage for transferring control word sequences from main storage into control storage. Control storage is logically partitioned into two areas, one area for resident control word sequences and the other area for transient control word sequences. The area for resident control word sequences is loaded at initial microprogram load time and does not change during operation of the computer system. These control word sequences supoort the most frequently used instructions and other frequently used functions in the computer system. The area for transient control word sequences is loaded as needed during run time under control of a resident microcoded overlay handler sequence and consists of the less frequently used instructions and other functions in the computer system.

Control words are read from main storage and written into control storage one word at a time. During the transfer of the control words from main storage into control storage certain facilities of the central processing unit are not being utilized. These facilities of the central processing unit would normally be utilized when executing a control word read from control storage. It is not possible, however, to read a control word from control storage while a control word is being written into control storage. The present invention provides control signals for operating those unused facilities of the central processing unit which can be used for dynamically generating the block check word while a control word is being transferred from main storage into control storage. By this arrangement, only control circuitry is required and no special circuitry is included for generating the block check word because the block check word can be formed by using existing central processing unit facilities having the functional capability for forming the block check word and which would otherwise be inactive during the transfer of a control word from main storage into control storage.

The overlay operation starts with the fetch of a control word from main storage and entry of that control word into a register in the CPU. An overlay control word is then read from control storage and entered into the control storage operation register. This overlay control word causes the control word read out of main storage and entered into a register in the centeral processing unit to be transferred to the input of control storage and to the input of the arithmetic and logic unit (ALU) of the central processing unit of the computer system. Simultaneously with this operation, control circuitry is activated for addressing a predetermined local storage register (LSR) which has been previously initialized with a predetermined value. This predetermined value in the selected local storage register is transferred under control of the control circuitry to the arithmetic and logic unit. The control circuitry then causes the arithmetic and logic unit to perform an exclusive OR operation simultaneously with the writing of the control word into control storage.

The results from the arithmetic and logic unit are returned to the selected local storage register. This operation is then followed by a cycle during which no control word is being executed. The control circuitry during the next cycle causes the control store address to be incremented via the arithmetic and logic unit which is caused to perform a binary add operation. The main storage address had already been incremented under control of the control circuitry, however the arithmetic and logic unit is not required for incrementing the main storage address. The register containing the main storage address has a built in incrementer. The control circuitry also causes a length register, which has been set to a predetermined value, to be decremented. The contents of the length register are tested for a zero value condition. If the value in the length register is not zero, the operation described repeats until all controls words in the module have been written into control storage; i.e., unti the length register is decremented to zero. A pre-calculated block check word is then fetched from main storage and compared with the calculated block check word fetched from the selected local storage register. If the calculated block check word compares equal to the pre-calculated block check word, the block of control words transferred from main storage into control storage are considered valid; otherwise an error indication is signalled.

A BRIEF DESCRIPTION OF THE DRAWINGS

FIGS. 1-1, 1-2, 1-3, 1-4 and 1-5 taken together as shown in FIG. 2 are a logic diagram of the invention;

DETAILED DESCRIPTION OF INVENTION

Figure 1:
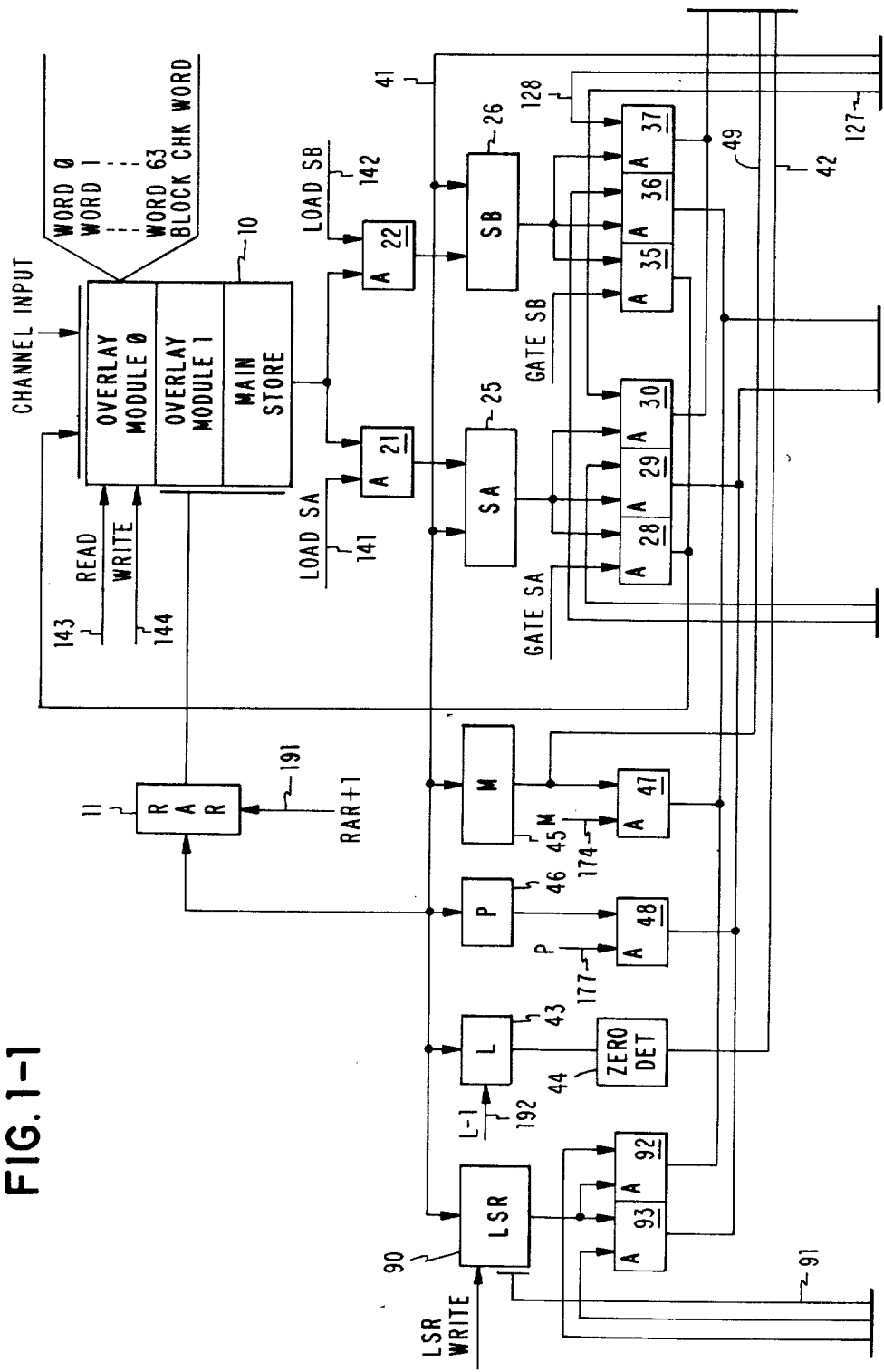

With reference to the drawings and particularly to FIGS. 1-1, 1-2, 1-3, 1-4 and 1-5 the invention is illustrated by way of example as being incorporated in a computer system having an addressable main storage 10 for storing data and control words which are to be transferred into control storage 15. Main storage 10 is a conventional read/write type of storage which is addressable by the contents of address register 11 (RAR). Data or control words read from main storage are entered into either SA register 25 or SB register 26 via AND circuits 21 or 22 repectively. The present invention does not require the use of two registers such as registers 25 and 26; however, in this particular example main storage 10 is quite slow and as will be seen later herein the usage of registers 25 and 26 is overlapped. It should be noted that AND circuits 21 and 22 represent a plurality of AND circuits in that the data path from main store in this particular example is 4 bytes wide as are registers 25 and 26. A byte consists of 8 bits of data plus a parity bit.

The outputs of registers 25 and 26 are applied to groups of AND circuits for controlling the transfer of data from these registers. More specifically the output of register 25 is applied to AND circuits 28, 29 and 30 which on being properly conditioned control the transfer of data from register 25 to storage 10, arithmetic and logic unit (ALU) 40 and to control storage 15, respectively. The output of register 26 is applied to AND circuits 35, 36 and 37 which control the transfer of data to main storage 10, ALU 40 and control storage 15 respectively. AND circuits 28 and 35 are controlled by gate SA and gate SB signals which are generated in response to execution of a fetch from main storage control word.

The fetch from main storage control word is in the resident control storage area 16 of control storage 15 which is accessed at a location specified by the address in control store address register (CSAR) 17. The storage control control word has a format field which identifies the type of control word, a branch condition field, a next address field, and a storage control field which includes a bit position for specifying a fetch or store operation.

The storage control (SC) word read from control storage 15 is entered into control store operation register 50. The control store operation register 50 is loaded under control of a signal generated from oscillator 100 which feeds clock generation logic 105. Clock generation logic 105 provides a LD CSAR signal on line 106 for loading control store address register 17 and provides a LD CSOR signal on line 107 which is used for loading control store operation register 50. The LD CSOR signal on line 107 is applied to AND circuits 109 and 110. AND circuit 109 is conditioned via inverter 108 in the absence of an overlay signal OL on line 123. The overlay OL signal on line 123, however, conditions AND circuit 110. AND circuits 109 and 110 feed OR circuit 111 to provide a LD CSOR bit 23 signal on line 113. AND circuit 109 provides a LD CSOR 0-22, 24-31 signal directly on line 114. As it will be seen later herein, a NO OP condition automatically occurrs after the decoding of an overlay control word in control store operation register 50. The NO OP condition is created in CSOR 50 by forcing bit 23 to a zero state while all other bit positions within CSOR 50 remain unchanged.

The format field of the storage control word SC in CSOR 50 is decoded by control word format decode logic 120. All of the control word format decode logic 120 is not shown in detail because there are vast numbers of different control word formats unrelated to the present invention. Only the details of the format decode for an overlay control word are shown. The signal generated from decoding the format of a storage control word is passed by the control word format decode logic 120 on line 121 to storage control decode logic 140 which also has inputs from the storage command field bits 14-31 of the storage control word over line 51. The storage control decode logic 140 consists of a combination of logical AND and OR circuits for decoding the input to produce a Load SA signal on line 141, a Load SB signal on line 142, a Read signal on line 143, a Write signal on line 144, a Gate SA signal on line 146 and a Gate SB signal on line 147. The load SA and load SB signals are applied to AND circuits 21 and 22 respectively for controlling the passage of data from main storage 10 into registers 25 and 26 respectively.

The storage control word for reading a control word from an overlay module in main storage is a storage control (SC) word having bits which would be decoded by storage control decode logic 140 for generating a Read signal on line 143 and a Load SA signal on line 141 whereby the control word read from the addressed location as specified by the contents of address register 11 is read from main storage and entered in SA register 25 via AND circuit 21.

The next word fetched from the resident portion 16 of control storage 15 is an overlay control (OL) word which is written into CSOR 50. The state of the bits 0-3 for the format field of the overlay control word are 0001. These bits are shown as being decoded by AND circuit 122 in the control word format decode logic 120. Bus 52 for applying the format control field to AND circuit 122 has inverters, not shown, for inverting the state of bits 0, 1 and 2. Bits 14 and 15 having a state of 1 and 0, respectively, are applied to AND circuit 122 via bus 53. Bus 53 has an inverter not shown for inverting the state of bit 15. Bits 22 and 23 are applied to AND circuit 122 via bus 54 which has an inverter for inverting the state of bit 22.

The output of AND circuit 122 produces an overlay control signal OL on line 123. The output of AND circuit 122 is applied to AND circits 124 and 125 where AND circuit 124 is conditioned by bit 16 via inverter 126 and AND circuit 125 is conditioned directly by bit 16. The outputs of AND circuits 124 and 125 are overlay SA register 25 (OL SA) and overlay register 26 (OL SB) signals on lines 127 and 128 respectively. The OL SA and OL SB signals are applied to AND circuits 30 and 37, respectively which have inputs from registers 25 and 26, respectively. The outputs of AND circuits 30 and 37 are commonly connected as a dot OR connection to bus 38 which is connected to the input of control storage 15. Thus, if the storage control word previously read from main storage 10 had been entered into SA register 25 then the overlay control word would condition AND circuit 30 whereby the contents of register 25 would be passed to the input of control storage 15 so as to be written into the transient area 18 specified by an address in CSAR 17.

The address in CSAR 17 comes from the next address decode logic 70 which receives a next address field and modifier fields from the overlay control word on buses 56, 57 and 58. Next address decode logic 70 also receives the OL signal on line 123 and other inputs which will be described later herein. The control word transferred from main storage 10 is written into the addressed location of control storage 15 under control of an OL write signal on line 118 coming from AND circit 117 which is feed by an OL signal on line 123 and a clock signal from clock generator 105. It should be noted that control storage 15 is written into only during an overlay operation where control words are transferred from main storage 10 into control storage 15. At all other times, control words are read from control storage 15. The Read signal on line 119 is passed by AND circuit 116 in the absence of a OL signal, i.e., AND circuit 116 is fed by the output of inverter 115 which is connected to line 123. AND circuit 116 is also fed by a clock signal from clock generator 105.

In view of the fact that the ALU 40 is not being used during the time that a control word is being written into control storage 15, the overlay signal OL is used to force an ALU function control signal for controlling the ALU to generate the block check word. ALU function control signals are normally generated for other types of control words requiring ALU functions by ALU function decode logic 155.

An exclusive OR ALU function control signal is normally provided by the ALU function decode logic 155 on line 156. Line 156 feeds OR circuit 157 which is also fed by line 123 carrying the OL signal. Hence, the exclusive OR ALU function control signal is also generated by the OL signal generated upon decoding an OL control word. The output of OR cirucit 157 forms part of bus 160 for applying ALU function control signals to ALU 40.

The block check word for a module of control words written into control storage 15 is formed by exclusive ORing the control word written into control storage 15 with a previously written control word.

Initially the first control word written into control storage 15 is exclusively ORed with the contents of an LSR register in an array of LSR registers 90 where the selected LSR register had previously been reset to zero. The LSR register used in the operation for generating the block check word is selected by an address on bus 91. Bus 91 is feed by a group of AND circuits 81-88 inclusive. The output of AND circuits 81 and 82 are connected together to form a dot OR connection as are the outputs of AND circuits 85 and 86. AND circuits 82 and 86 have one inout tied to a voltage level and the other input connected to receive the OL signal via line 123. AND circuits 81, 83, 84, 85, 87, and 88 are conditioned by a LSR source signal on conductor 130 and by bits coming from certain fields within CSOR register 50 via bus 59. An overlay control word does not provide a signal on line 130 or bits on bus 59. Thus AND circuits 81, 83, 84, 85, 87, and 88 are all producing zero bits, however AND circuits 82 and 86 are producing 1 bits whereby the LSR address becomes 100100 for addressing a specific LSR register in LSR register array 90.

The output of the selected LSR register is applied to AND circuits 92 and 93 which are conditioned by OL SA and OL SB signals via OR circuits 131 and 132 respectively. The outputs of AND circuits 92 and 93 feed into the right and left hand inputs of ALU 40 respectively. Thus in the case where the control word being written into control storage 15 is in register 25, the contents of the selected LSR register in LSR register array 90 would be applied to ALU 40 via AND circuit 92 while the contents from register 25 would be applied to ALU 40 via AND circuit 29. Conversly, when the control word to be written into control storage 15 resides in SB register 26, the contents of that register are applied via AND circuit 36 to ALU 40 and the contents of the selected LSR are applied to ALU 40 via AND circuit 93. AND circuits 29 and 36 are conditioned by the OL SA and OL SB signals via OR circuits 175 and 176 respectively. The output of ALU 40 is on bus 41 which feeds SA register 25, SB register 26 and the LSR registers 90. Thus the result or block check word formed by exclusive ORing the contents of the SA register 25 with the contents of the selected LSR register can be returned to the selected LSR register. The formation and storage of the block check word takes place simultaneously with the writing of the control word into control storage 15 as seen in the timing diagram of FIG. 3.

Because control words are fetched from control storage 15 so as to permit the fetching and execution of control words in an overlapped manner and since a control word could not be read from control storage 15 simultaneously with the writing of a control word into control storage 15, the next control word to be executed is a forced no operation (NOP) control word, i.e., no operation takes place during the execution of the NOP control word; however, a control word is read from control storage 15 so as to be available for execution during the cycle following the NOP cycle.

The NOP control word is forced by forcing bit 23 in CSOR register 50 to zero. The OL signal on line 123 generated in response to executing an overlay control word OL inhibits AND circuit 109 via inverter 108, whereby during the load operation of CSOR register 50, only bit 23 is loaded and this is accomplished by the LD CSOR bit 23 signal on line 113 via AND circuit 110 and OR circuit 111. Bit 23 coming from control storage 15 is applied to AND circuit 19 which is conditioned by the output of inverter 108. Thus when there is an OL signal on line 123 such as when an OL control word is executed, then during the following cycle bit 23 is forced to zero. Again it should be noted that the present invention does not require the overlapping of fetching and execution of control words. In the embodiment of the present example, however execution of a control word is overlapped with the fetching of a control word.

The control word fetched during the NOP cycle is a general arithmetic (GA) control word which is used to form the address which is to be loaded into CSAR 17 for designating the location of the next control word to be written into control storage 15. M register 45 normally functions as the accumulator for ALU 40. In this instance M register 45 contains the address of the location where the first control word was written into the transient area 18 of control storage 15. That address must now be incremented. This incrementing is accomplished by the GA control word. The incremental value is contained in P register 46. The contents of registers 45 and 46 are gated to inputs of ALU 40 via AND circuits 47 and 48 respectively. The GA control word has a source register field and the bits therefrom are applied via bus 59 to source register decode 170. Source register decode 170 generates signals M and P on lines 174 and 177 upon decoding the source register field of the GA control word. The GA control word is recognized by decoding the format of that control word and this is done by the control word format decode logic 120 to develop signals on bus 134 indicating the type of control word decoded. The signal on bus 134 indicating that a GA control word was decoded is applied to source register decode 170 as well as to next address decode logic 70, ALU function decode 155 and status control decode 190.

The M and P signals on lines 174 and 177 condition AND circuits 47 and 48 respectively whereby the contents of M register 45 and P register 46 are applied to ALU 40. The bits in the ALU function field of control word GA are applied to the ALU function decode logic 155 via bus 60. ALU function decode logic 155 generates a binary add signal on line 158 which is applied to ALU 40 via bus 160. The results of the binary add operation perform the incremented address which is returned into register 45 via bus 41. The output of register 45 is applied to the next address decode logic 70 via bus 49.

The GA control word also generates control signals for incrementing the address in the main storage address register 11 and for decrementing the contents of a length count register 43. The status control field of the GA control word is applied via bus 61 to the status control decode logic 190 which interprets this bit field and generates the RAR +1 signal on line 191 and the L−1 signal on line 192. Registers 11 and 43 have incrementors and decrementors built therein respectively. By this arrangement as seen in FIG. 4, the main storage address is incremented and the length counted is decremented simultaneously with the incrementing of the address which is to be placed into register 17 as previously described.

Length count register 43 contains a value such that when the last control word from an overlay module has been written into control storage 15, the value in register 43 becomes zero. The zero value in register 43 is detected by zero detect circuit 44 whose output feeds the next address decode logic 70 via line 42. When the value in length count register 43 goes to zero, the pre-calculated block check word which is the last word in the overlay module has already been fetched from main storage and is residing in either SA register 25 or SB register 26.

Figures 1, 2, 3:
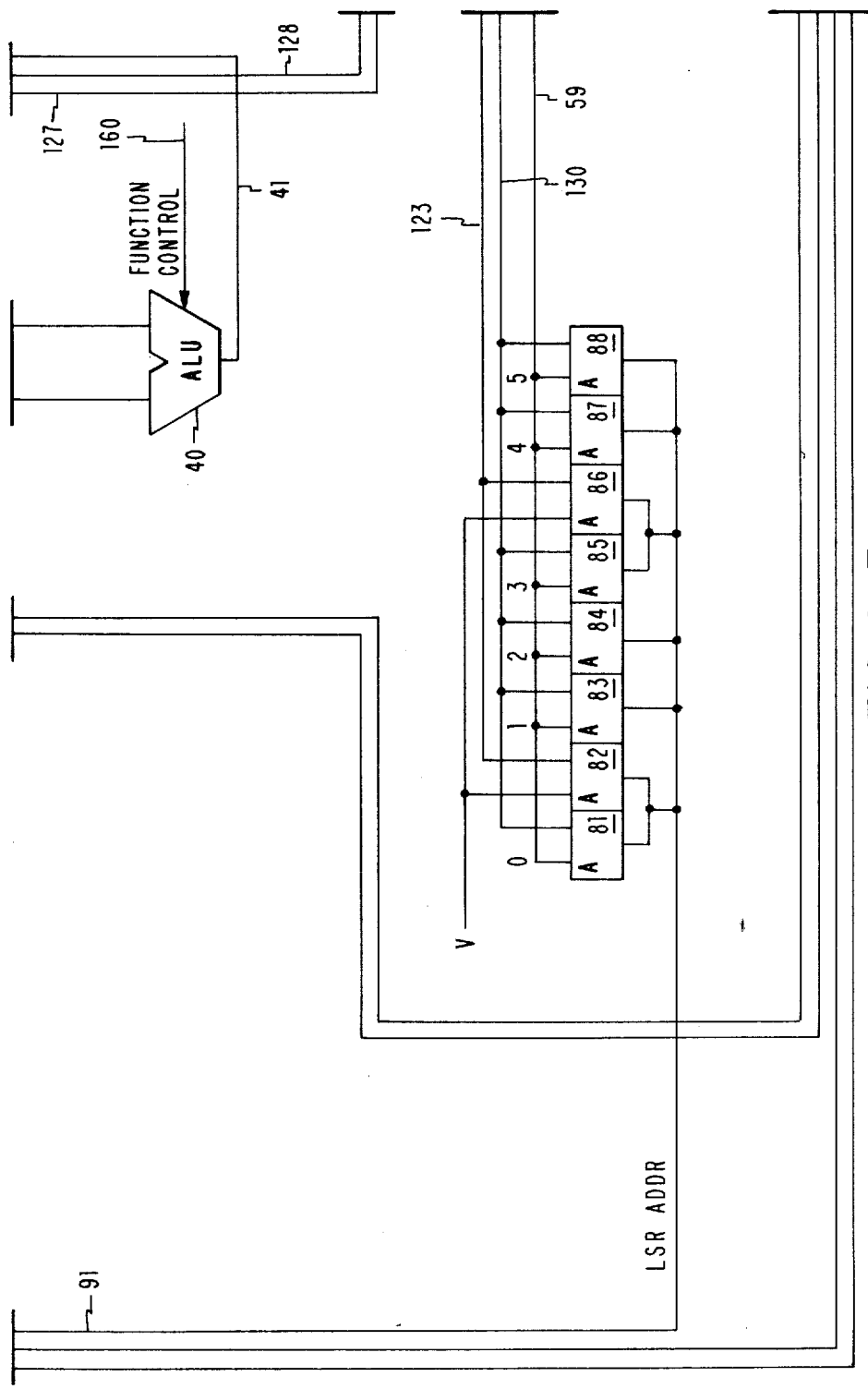
FIG. 2 is a schematic diagram illustrating the arrangement of FIGS. 1-1, 1-2, 1-3, 1-4 and 1-5.
FIG. 3 is a timing diagram illustrating the operation of the invention as embodied in FIGS. 1-1, 1-2, 1-3, 1-4 and 1-5; and, FIG. 4 is a timing diagram along the lines of FIG. 3 showing the decrement of the length counter and the action taken when the length counter is decremented to zero.
Figures 1, 2, 3, 4, 5:
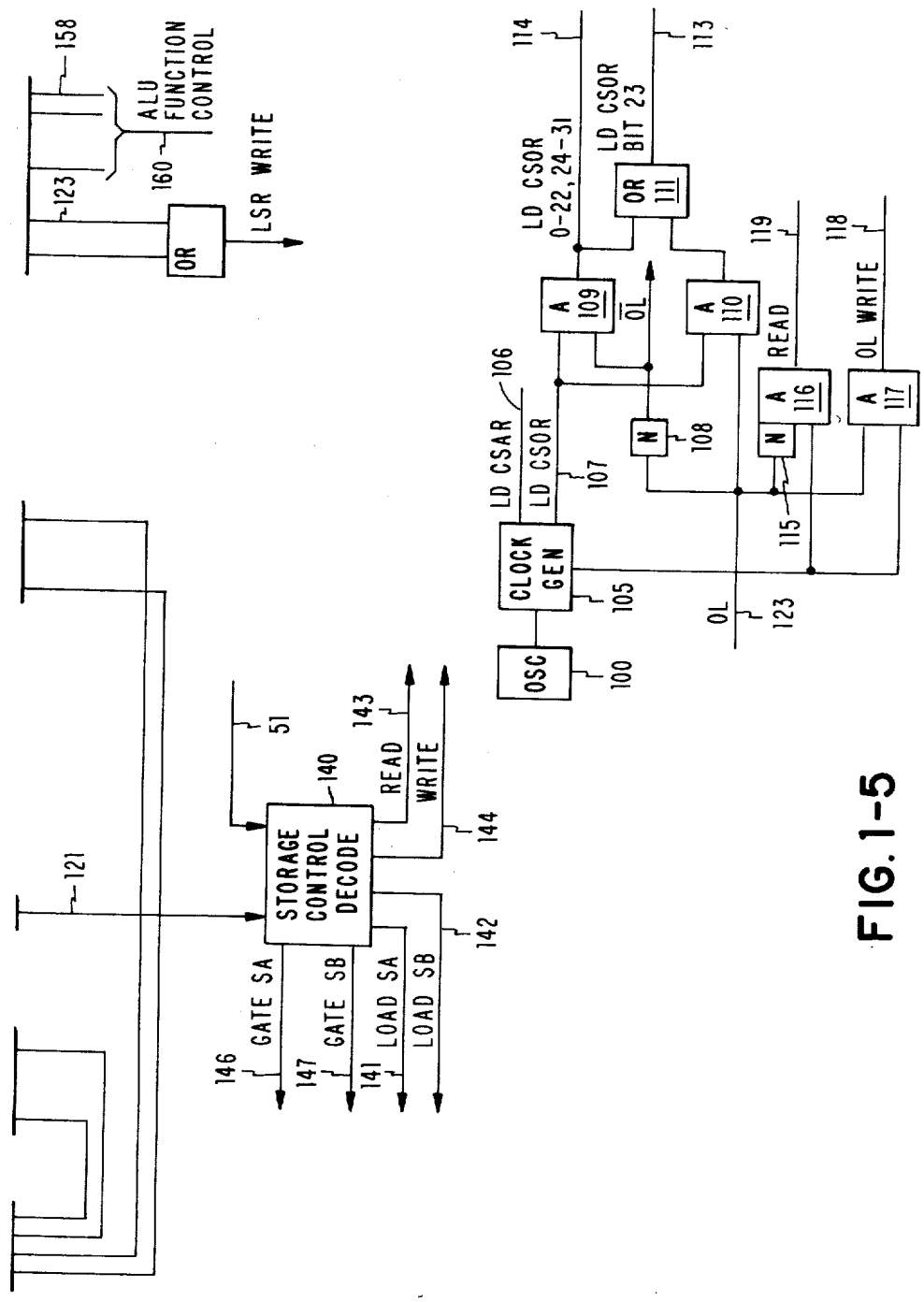
Figure 3:
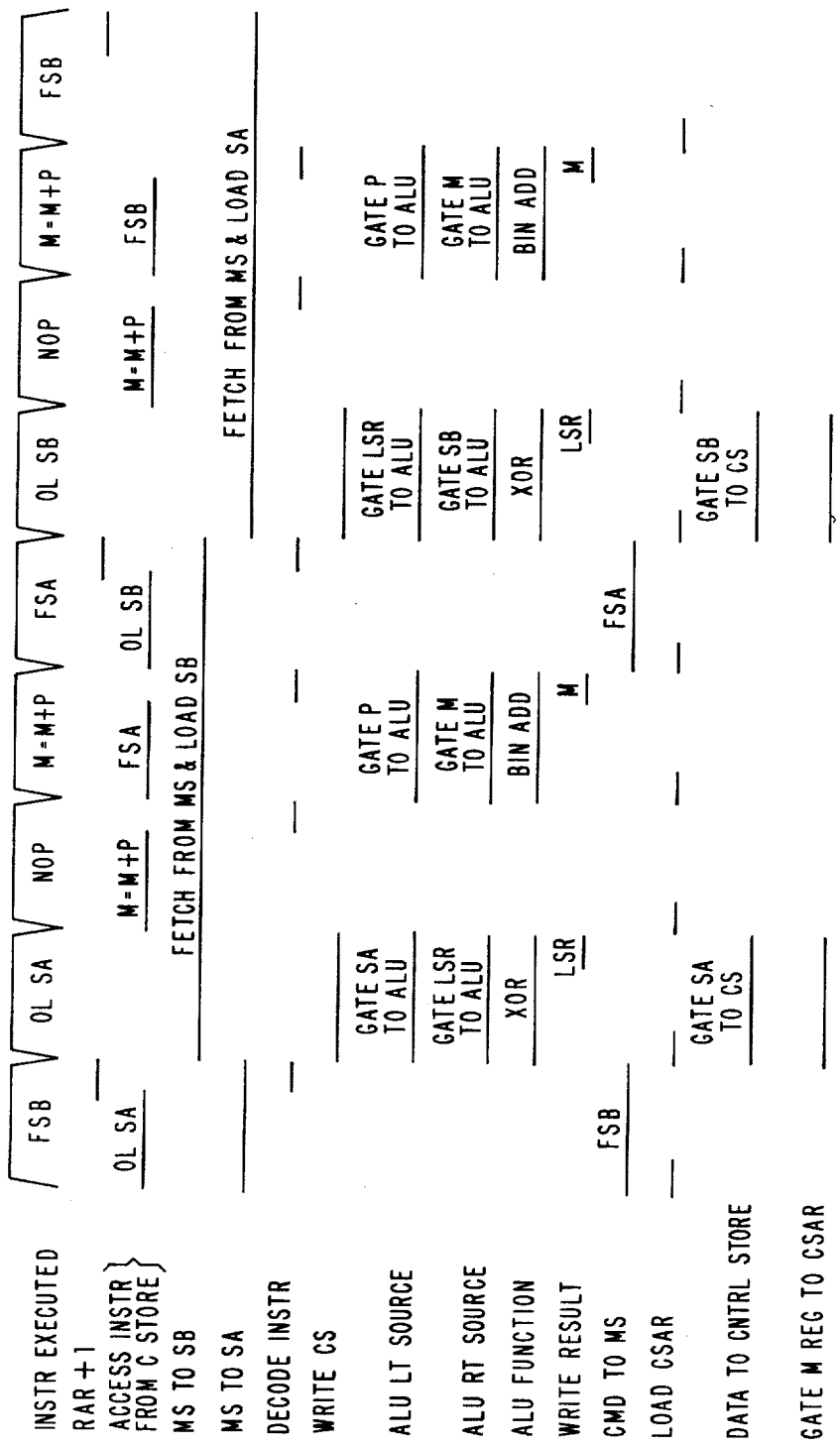

The examples shown in the timing diagram of FIG. 4 show that the pre-calculated block check word has been fetched from main storage 10 and entered into SB register 26. Although the storage control word initiates the main storage fetch operation, it will be recalled that the data is not available from main storage until several cycles later as illustrated in FIG. 3. The fetch operation from main storage 10 to SB register 26 is then followed by an overlay operation where the control word already in SA register 25 is written into the transient area 18 of control storage 15. This cycle is then followed by an NOP cycle previously described. The next control word executed is then a GA control word as previously described for incrementing the contents of the M register 45 by the value in P register 46. Simultaneously with the execution of the GA control word, the length count register 43 is decremented.

Normally the address which is placed into CSAR 17 comes from the control word being executed and in this instance the GA control word. The address is modified; however, in the next address decode logic 70 when the length count in register 43 is zero as detected by zero detect circuit 44. Thus the signal from zero detect circuit 44 functions in a manner similar to a branch operation by modifying the address which is loaded into CSAR.

If length count register 43 had not been decremented to zero, then the next control word fetched from control storage 15 would be a storage control word fetched from the resident area 16 and the three instruction sub-loop described would restart or repeat.

When the length count in register 43 is zero the modified address loaded into CSAR 17 causes a GA control word to be fetched whereby the pre-calculated block check word in SB register 26 is exclusive ORed with the dynamically calculated block check word retrieved from one of the LSR registers 90 which is selected by the source field in the GA control word. The source field in the GA control word can produce the same LSR address as produced by the OL signal. The next control word executed is a branch control word whereby if the result of the exclusive OR operation is zero the next word fetched is some control word which proceeds to transfer control to transient control words and if other than zero a branch is taken to an error routine.

From the foregoing, it is seen that the invention provides control for generating a block check word simultaneously with the writing of control words into control storage. It is also seen that after all of the control words in an overlay module have been written into control storage, a pre-calculated block check word is compared with the dynamically calculated block check word and if the results of the comparison are other than zero an error condition is indicated.

Having thus described the invention, what is claimed as new and desired to be secured by Letters Patent is:

1. In a computer system having a main storage for storing data, instructions and control words, a central processing unit (CPU) including a writable control storage, a arithmetic and logic unit (ALU) operable in response to an exclusive OR function control signal to perform an exclusive OR operation, and an addressable register initialized with a predetermined operand, said ALU connected to receive an operand from said addressable register and control words read from said main storage to be written into control storage, the improvement comprising:

reading means in said CPU connected to said main storage for reading control words from said main storage, writing means in said CPU connected to said reading means and to said control storage and operable in response to said reading means reading control words from main storage for writing said control words read from said main storage into control storage, and means in said CPU connected to said writing means operable in response to said writing means writing control words into control storage for generating exclusive OR function control signals and transfer control signals to control said ALU in said CPU to perform an exclusive OR operation with the operand from said addressable register with the control word being written into control storage, and to control the transfer of said operand from said addressable register and the transfer of said control word being written into control storage to said ALU whereby a block check word is simultaneously generated as a control word is written into control storage.

2. In a computer system having an addressable main storage for storing data, instructions and control words, an addressable writeable control storage partitioned into resident and transient areas for storing control words, said resident area storing at least storage control, arithmetic control and overlay control words, a central processing unit (CPU) having circuits elements for reading and executing control words from said writing control words into said control storage, and including an addressable register initialized with a predetermined operand, said overlay control word upon being executed by said circuit elements in said CPU causes only some of said circuit elements to generate signals for writing a control word read from said main storage into said transient area of said control storage, the improvement comprising: control means in said CPU responsive to at least one of said signals generated by said only some of said circuit elements upon said circuit elements executing said overlay control word for generating control signals for causing other circuit elements of said circuit elements in said CPU to generate a block check word from said control word being written into control storage together with the contents of said addressable register simultaneously with the writing of said control word into control storage, said control means including means for causing the addressing of said addressable register and for returning the generated block check word to said addressable register.

3. The computer system of claim 2 wherein said circuit elements of said CPU include means for registering a value corresponding to a predetermined number of control words in said main storage to be transferred therefrom and written into said transient area of said control storage, means for decrementing said value in response to one of said signals generated by said only some of said circuit elements each time an overlay control word is executed, means for generating an address change bit when said value is decremented to zero, whereby an arithmetic control word is caused to be fetched from said resident area of control storage, said arithmetic control word upon being executed generates control signals for causing said other circuit elements to check said generated block check word.

4. The computer system of claim 2, wherein said main storage stores a pre-calculated block check word along with a module of control words to be written into control storage for comparison with said calculated block check word.

5. The computer system of claim 4, wherein said pre-calculated block check word is fetched from said main storage by having said circuit elements in said CPU fetch and execute a storage control word.

6. The computer system of claim 5, wherein said circuit elements in said CPU after fetching said pre-calculated block check word from said main storage fetch and execute an arithmetic control word for causing an exclusive OR logic operation of said pre-calculated block check word with said calculated block check word.

7. The computer system of claim 6 wherein said circuit elements in said CPU generate an error signal when the results of said exclusive OR operation are other than zero.

8. Control circuitry in a computer system for controlling central processing unit (CPU) elements which would be otherwise idle during transfer of control words on demand from main storage to control storage in a manner to generate a block check word from the control words being transferred, said CPU including an arithmetic and logic unit (ALU), and addressable register means initialized with a predetermined value, the improvement comprising:

means responsive to a control storage write instruction for generating ALU function and gating control signals and address signls for addressing said register means initialized with a predetermined value, means for applying said address signals to said register means, first gating means connected to receive the value from said register means and control words to be written into control storage and having outputs connected to said ALU, second gating means connected to receive the output from said ALU and connected to the input of said register means, and means for applying said ALU function control signals to said ALU and said gating control signals to said first gating means to control the operation thereof for passing the control word being written into control storage to said ALU and for passing the value from said register means to said ALU and to said second gating means to control the operation thereof for returning the output from said ALU to said register means.

* * * * *

UNITED STATES PATENT AND TRADEMARK OFFICE
CERTIFICATE OF CORRECTION

PATENT NO. : 4,266,272

DATED : May 5, 1981

INVENTOR(S) : Neil C. Berglund and William G. Kempke

It is certified that error appears in the above—identified patent and that said Letters Patent is hereby corrected as shown below:

Column 9, line 46, "storage. a" should read -- storage, an --

Column 9, line 50, "ALU connected" should read -- ALU being connected --

Column 10, line 16, "said" should read -- and --

Signed and Sealed this

Tenth Day of November 1981

[SEAL]

Attest:

Attesting Officer

GERALD J. MOSSINGHOFF

Commissioner of Patents and Trademarks